United States Patent Office 2,929,681
Patented Mar. 22, 1960

2,929,681

GLUTAMIC ACID RECOVERY

Earl V. Cardinal, Deerfield, Ill., and William A. Dow, Jr., Madison Heights, Mich., assignors to International Minerals & Chemical Corporation, a corporation of New York No Drawing. Application December 27, 1956
Serial No. 630,771

5 Claims. (Cl. 23—147)

The present invention relates to the recovery of glutamic acid from impure solutions thereof. More particularly, it relates to the recovery of glutamic acid from such solutions by precipitation in the form of zinc glutamate salts.

Glutamic acid is now well known and widely used in the form of its monosodium salt for enhancing the flavor of certain foods and food products. Conventional processes for the production of glutamic acid involve acid hydrolysis or alkaline hydrolysis of materials containing glutamic acid precursor compounds, such as wheat gluten, corn gluten, and other vegetable proteins, casein and other animal proteins, and beet molasses residues such as Steffen's filtrate, barium filtrate, schlempe, vinasse, and the like. The glutamic acid is ordinarily recovered from the hydrolyzates by a procedure which involves precipitation and removal of organic and inorganic impurities, followed by crystallization of the glutamic acid at its isoelectric point, pH 3.2. In all such cases, the resulting mother liquor (or "end liquor," as it is conventionally called) contains a considerable proportion of the original glutamic acid values, from 25 to 40% or more, which cannot be recovered by isoelectric crystallization, and which represents a serious economic impediment in the prior-art processes.

A method for precipitating glutamic acid from end liquors in the form of a zinc glutamate salt is described and claimed in copending application Serial No. 407,571 of Earl V. Cardinal, filed February 1, 1954, now Patent No. 2,849,468. In the Cardinal technique, to be described more fully hereinafter, an end liquor is reacted with zinc hydroxide at a pH between about 5.5 and about 11.0; and by suitable choice of other operating conditions, as much as 90% or more of the glutamic acid values in the end liquor can be precipitated therefrom in the form of water-insoluble zinc glutamate salts. The regeneration and recovery of the glutamic acid from the zinc glutamate salts was carried out by precipitating the zinc with hydrogen sulfide, sodium sulfide, or sodium carbonate. These methods for regeneration and recovery, while technically successful, were expensive, difficult to apply on a large scale, and apparently incapable of effecting quantitative recovery of glutamic acid.

An important object of the present invention is to provide a means for effective recovery of glutamic acid from zinc glutamate compositions.

Another object of the invention is to provide a process for the recovery of glutamic acid from impure aqueous solutions thereof.

Another object is to recover glutamic acid from end liquors obtained in the isoelectric crystallization of glutamic acid.

Another object is to extract glutamic acid from zinc glutamate salts while minimizing the solubility of zinc.

Another object is to improve the filtration rate in the extraction of glutamic acid from zinc glutamate salts.

These and other objects of our invention will be apparent from the present description and claims.

We have discovered that glutamic acid can be effectively eluted or extracted from zinc glutamate salts with an aqueous solution of a strong base such as sodium hydroxide, potassium hydroxide, or other alkali-metal hydroxide without substantial solubilization of zinc if the pH under which the extraction is carried out is maintained within the critical range of about 12.4 to about 13. At pH levels below about 12.4, the solubility of glutamic acid drops precipitously, while at pH levels above about 13.0, zinc rises rapidly in solubility. Surprisingly, however, between these limits zinc is substantially completely insoluble, while the glutamic acid is readily dissolved. Furthermore, within this critical pH range, the extraction mixture filters readily, whereas filtration is quite difficult at pH levels below the defined range.

As set forth hereinabove, our invention is useful in conjunction with the recovery of glutamic acid from impure aqueous solutions thereof, in particular end liquors containing glutamic acid. By the term "end liquors" is meant a hydrolyzate, such as a protein hydrolyzate, a barium filtrate hydrolyzate, a vinasse hydrolyzate, a schlempe hydrolyzate, or other crude glutamic acid-containing solution from which part of the glutamic acid has been separated by crystallization. The end liquor usually contains about 2.5% by weight of glutamic acid and up to about 60% solids.

During the processing of hydrolyzates by conventional techniques, which generally involve the removal of various organic and inorganic impurities prior to the isoelectric crystallization of glutamic acid, a portion of the glutamic acid content of the hydrolyzate is ordinarily converted to pyrrolidonecarboxylic acid, the lactam of glutamic acid. The latter material, if present in the end liquor to any considerable extent, should be reconverted to glutamic acid by subjecting the end liquor to hydrolysis under conventional conditions prior to reaction with zinc.

In the separation of glutamic acid from end liquors or other impure solutions thereof, the solution is diluted, if necessary, with up to around 10 volumes or more of water, preferably between about 1 and about 5 volumes, depending upon the glutamic acid concentration, to decrease the viscosity thereof and to reduce the glutamic acid content to between about 0.1 and about 2% by weight. A zinc compound is then added thereto. Zinc chloride, zinc bromide, zinc iodide, zinc nitrate, zinc sulfate, sodium zincate, or other soluble zinc salt is preferred, but we may also use zinc oxide, zinc peroxide, or zinc hydroxide. All of these materials appear to afford zinc hydroxide under the conditions employed for zinc glutamate formation. The zinc to glutamic acid molar ratio should be between about 5:1 and 25:1, preferably between about 10:1 and 20:1, in order to achieve maximum glutamic acid recovery. To the resulting mixture is added a sufficient quantity of alkali, suitably sodium hydroxide, potassium hydroxide, calcium hydroxide or the like, to produce a pH between about 7 and about 10, preferably between about 8 and about 8.5. The resulting mixture is allowed to stand at a temperature between about 0 and about 35° C., preferably between about 20 and about 30° C., for about 1 to about 24 hours, during which time a precipitate comprising zinc glutamate is formed, and the precipitate is then separated by filtration or the like.

In accordance with our invention, a zinc glutamate composition obtained, for example, as described above, is commingled with a sufficient quantity of water to produce a fluid slurry, the weight ratio of water to crude zinc glutamate being suitably between about 1:1 and about 10:1, preferably around 2:1. To this slurry is added, with stirring, a sufficient quantity of an aqueous solution of potassium hydroxide or preferably sodium hydroxide to produce a pH within the range of about 12.4 to about 13, as measured, for example, with the so-called "Type E" electrodes (Beckman Instruments, Inc., South Pasadena, California) or the like, which are especially adapted to operation in highly alkaline solutions. Owing to differences in type and content of impurities in the crude zinc glutamate, it is difficult to define a precise correlation between pH and the proportion of alkali employed. Ordinarily, however, we find it satisfactory to employ a molar ratio of alkali to the glutamic acid equivalent of the zinc glutamate between about 4:1 and about 10:1, preferably around 6:1. This corresponds to between about 50 and about 100 grams of aqueous 50% sodium hydroxide solution to treat the crude zinc glutamate cake obtained from one kilogram of a typical Steffen's filtrate end liquor containing about 2% by weight of glutamic acid. The preferred pH level is about 12.8. The slurry is heated to a temperature between about 60 and about 100° C., preferably between about 80 and about 90° C., and is filtered or otherwise treated to separate the solid phase without substantial cooling. The extraction of the glutamic acid proceeds quite rapidly, so that no prolonged holding time under these conditions is necessary, a contact time of about 5 to about 30 minutes being adequate. We find that the use of temperatures within this range not only improves the extraction of glutamic acid, but also increases the rate of filtration and reduces the amount of zinc going into the filtrate. The filtrate contains largely disodium glutamate (where sodium hydroxide is employed for the extraction), and is readily purified to yield a glutamic acid product of the desired type. The solid phase is a mixture of zinc hydroxide, zinc oxides, and organic impurities, from which the zinc values are readily recovered in a form suitable for recycle.

In another embodiment of our invention, the elution of crude zinc glutamate is carried out by mixing it with an alkaline hydrolyzate of a glutamic acid mother substance, e.g., alkali-hydrolyzed Steffen's filtrate or the like, under appropriate conditions of pH and temperature as set forth hereinabove. The glutamic acid is extracted thereby, and is further treated and recovered in a conventional manner in conjunction with the hydrolyzate. The zinc is precipitated as the hydroxide, and is filtered off for recycle.

It will be apparent that our invention is adapted generally to the treatment of zinc glutamate compositions for the separation and recovery of glutamic acid values therefrom. In a preferred embodiment, however, our invention is an important feature of an integrated process for the recovery of glutamic acid values from end liquors through the formation of zinc glutamates.

Our invention will be more fully understood from the following operating examples.

Example 1

Two kilograms of concentrated Steffen's filtrate end liquor having a pH of 3.2 and a dry solids content of about 63% by weight, including about 2% glutamic acid, are diluted with 2 kilograms of water and allowed to stand for about 12 hours. The resulting slimy precipitate is removed by precoat filtration and discarded. To the filtrate are added 300 grams of fresh precipitated zinc hydroxide with thorough agitation, and the mixture is adjusted to pH 8.5 with a 4 M aqueous suspension of calcium hydroxide, then allowed to stand about 10 hours. The precipitated zinc glutamate is filtered off and washed three times by reslurrying in 500-milliliter portions of water. The washed cake is slurried with 200 grams of aqueous 50% sodium hydroxide solution, heated to 90° C., and filtered rapidly at 90° C., yielding a solution of disodium glutamate containing approximately 90% of the glutamic acid values originally contained in the end liquor.

Example 2

A process as in Example 1 employing 400 grams of zinc chloride instead of zinc hydroxide gives a slightly higher recovery of glutamic acid. The zinc is recovered in the form of the hydroxide for reuse.

Example 3

The following tests were carried out to study the effect of the quantity of alkali in our extraction step on the filtration rates and on the zinc losses in the filtrates.

The zinc glutamate precipitates that were used for these elution studies were prepared individually according to the following procedure: In each case, a zinc hydroxide cake was prepared by adjusting an aqueous solution containing 400 grams of $ZnCl_2$ to pH 7 with sodium hydroxide. The zinc hydroxide was filtered off and the wet filter cake was added to a 2-kilogram portion of concentrated Steffen's filtrate end liquor. The resulting slurry, after vigorous agitation for one hour, was adjusted to pH 8.5 with an aqueous lime slurry and agitated for one hour to precipitate zinc glutamate. The precipitate was filtered off and washed by resuspending three times in 500-milliliter portions of water and filtering.

In each test, the washed zinc glutamate cake was slurried with 800 milliliters of water. To the slurry was added a quantity of an aqueous 50% solution of sodium hydroxide, as designated in the following table. The slurry temperature was then adjusted to the indicated level, and the slurry was filtered. The filtrate volume collected during the first two minutes was recorded in each case as an indication of the relative filtration rate. The results demonstrate that the filtration rate was markedly improved at higher temperatures and higher pH levels:

| Weight of 50% NaOH, g. | pH | Filtrate Volume at End of 2 Minutes | | | | |
|---|---|---|---|---|---|---|
| | | 25° C. | 35° C. | 45° C. | 60° C. | 90° C. |
| | | Ml. | Ml. | Ml. | Ml. | Ml. |
| 150 | 12.74 | 55 | 90 | 145 | | 230 |
| 175 | 13.0 | 170 | 175 | 185 | | 260 |
| 200 | 13.05 | 185 | 180 | 195 | | 255 |
| 200 | 13.1 | 175 | | | 225 | 257 |
| 250 | 13.1 | 190 | 188 | 230 | | 268 |
| 300 | 13.2 | 225 | 225 | 245 | | 317 |
| 350 | 13.15 | 257 | 250 | 270 | | 445 |

The zinc losses in the total filtrates from the above tests were also determined at three filtration temperatures. The results demonstrate that the zinc losses increase sharply at around pH 13.0:

| Weight of 50% NaOH, g. | pH | Zinc Lost in Filtrate | | | | | |
|---|---|---|---|---|---|---|---|
| | | Weight, grams | | | Percent of Original | | |
| | | 25° C. | 60° C. | 90° C. | 25° C. | 60° C. | 90° C. |
| 150 | 12.74 | 0.63 | | 0.18 | 1.31 | | 0.38 |
| 175 | 13.0 | 0.91 | | 0.29 | 1.90 | | 0.69 |
| 200 | 13.05 | | | 0.37 | | | 0.77 |
| 200 | 13.1 | 1.79 | 0.51 | 0.31 | 3.72 | 1.06 | 0.65 |
| 250 | 13.1 | | | 0.75 | | | 1.56 |
| 300 | 13.2 | | | 1.54 | | | 3.20 |
| 350 | 13.15 | 6.48 | | 2.92 | 13.50 | | 6.08 |

The above data demonstrate that the filtration rate increases both with increasing temperature and alkali concentration. Zinc losses decrease with higher temperature and lower alkali concentration. In the foregoing tests, it is apparent that, from the point of view of maximizing the filtration rate and minimizing the zinc losses, the elution was best carried out with about 200 grams of aqueous 50% sodium hydroxide solution at a temperature of about 90° C.

Example 4

The following tests were carried out to demonstrate the effect of pH on the elution of glutamic acid from a zinc glutamate precipitate prepared from unhydrolyzed end liquor obtained from concentrated Steffen's filtrate.

For each test, a 1-kilogram portion of end liquor was diluted 1:1 with water, commingled with freshly precipitated zinc hydroxide in a molar ratio of zinc to glutamic acid of 10.8:1, and adjusted to pH 8.5 at 26° C. with aqueous lime slurry to effect precipitation of zinc glutamate. The precipitate was filtered off and subjected to elution tests.

In each elution test, the zinc glutamate precipitate from 1 kilogram of end liquor was slurried with water and a sufficient quantity of aqueous 50% sodium hydroxide solution to reach the desired pH level. The slurry was heated to 90° C. and filtered hot. The filtrate was analyzed for glutamic acid content. The results demonstrate that a pH of about 12.4 is required for substantially complete glutamic acid elution:

| pH | Weight of 50% NaOH, g. | Glutamic acid Recovery, percent |
| --- | --- | --- |
| 12.2 | 45.0 | 91.5 |
| 12.4 | 55.6 | 99.5 |
| 12.7 | 75.2 | 99.0 |
| 13.0 | 125.0 | 101.0 |

While we have described our invention with reference to certain manipulative steps, process materials, charging stocks, and operating examples, such matters are intended to be illustrative only and not as limitations upon the scope of the invention. Numerous modifications and equivalents of the invention will be apparent from the foregoing description to those skilled in the art.

In accordance with the foregoing description, we claim as our invention:

1. A process for treating a zinc glutamate composition and separately recovering the zinc content thereof as zinc hydroxide and the glutamate content as an alkali metal glutamate, which comprises contacting said composition at a pH between about 12.4 and about 13 and at a temperature in the range between about 60 and about 100° C. with an aqueous solution of an alkali-metal hydroxide in a molar ratio of alkali-metal hydroxide to said glutamate content between about 4:1 and about 10:1, whereby the zinc content of said zinc glutamate composition is converted substantially completely into solid-phase zinc hydroxide and the glutamate content is converted substantially completely into an aqueous solution of alkali-metal glutamate, and separating the solid and liquid phases at a temperature within said range.

2. The process of claim 1 wherein said alkali-metal hydroxide is sodium hydroxide.

3. The process of claim 1 wherein said alkali-metal hydroxide is potassium hydroxide.

4. The process of claim 1 wherein said aqueous solution of an alkali-metal hydroxide is a solution obtained by hydrolysis of a glutamic acid mother substance with an alkali-metal hydroxide in aqueous solution.

5. A process for treating zinc glutamate and separately recovering the zinc content thereof as zinc hydroxide and the glutamate content as disodium glutamate, which comprises contacting said zinc glutamate at a pH around 12.8 and a temperature within the range of about 80 to about 90° C. with an aqueous solution of sodium hydroxide in a molar ratio of sodium hydroxide to glutamate around 6:1, whereby the zinc glutamate is converted substantially completely into solid-phase zinc hydroxide and an aqueous solution of disodium glutamate, and separating the solid and liquid phases at a temperature within said range.

References Cited in the file of this patent
UNITED STATES PATENTS 2,535,117    Bennett    Dec. 26, 1950
2,849,468    Cardinal    Aug. 26, 1958

OTHER REFERENCES

Abderhalden et al.: Hoppe Seyler's Zeit. f. Physiol. Chem. 38 (1910), p. 501.

Lowry: Inorganic Chemistry, MacMillan & Co., London (1931), pp. 896, 894.

Heisig: Semimicro Qualitative Analysis, 2nd ed. (1950), p. 194.